(12) United States Patent
Nguyen et al.

(10) Patent No.: US 7,668,999 B2
(45) Date of Patent: Feb. 23, 2010

(54) COMPUTER SYSTEM WITH IMPROVED BUS HANDLING

(75) Inventors: Thao Nguyen, Pflugerville, TX (US); Peter A. Woytovech, Round Rock, TX (US); Lowell B. Dennis, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 603 days.

(21) Appl. No.: 10/197,740

(22) Filed: Jul. 18, 2002

(65) Prior Publication Data

US 2004/0015632 A1  Jan. 22, 2004

(51) Int. Cl.
*H05K 7/10* (2006.01)
(52) U.S. Cl. .......................... 710/301; 710/10
(58) Field of Classification Search .................. 710/8, 710/10, 100, 300–304, 104; 713/1, 2
See application file for complete search history.

(56) References Cited

U.S. PATENT DOCUMENTS 5,892,929 A * 4/1999 Welker ........................ 710/107
5,948,076 A * 9/1999 Anubolu et al. ................ 710/8
6,081,861 A   6/2000 Kelley et al.
6,425,079 B1 * 7/2002 Mahmoud ...................... 713/2

OTHER PUBLICATIONS

Definition of PCI Configuration Space, Answer.com.*
Definition of Peripheral Component Interconnect, Answer.com.*
PCI Architecture, section 6.6.1, undated.*

* cited by examiner

*Primary Examiner*—Khanh Dang
(74) *Attorney, Agent, or Firm*—Baker Botts L.L.P.

(57) ABSTRACT

A method for retrieving information about a device within an information handling system comprising a central processing unit and a plurality of devices coupled with the central processing system through an internal bus and a slot based bus expansion system for adding a plurality of devices, comprises the steps of:
  determining the location of a device within the system;
  if the device is coupled through the internal bus, then requesting a primary identification information from the device;
  otherwise requesting a secondary identification information from the device.

3 Claims, 3 Drawing Sheets

COMPUTER SYSTEM WITH IMPROVED BUS HANDLING

FIELD OF THE INVENTION

The present invention relates to a computer system, including a bus system for coupling a plurality of peripheral devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as personal computers, servers, laptop computer with docking stations, and other computer systems having a bus system for adapter cards are well known in the art. These computer systems typically include a CPU coupled with a plurality of on board devices, such as, a clock system, a timer unit, a plurality of memory modules, etc. Usually dedicated internal bus structures are used to exchange data between these modules and the CPU. Other logic is provided to couple the CPU with a high bandwidth local expansion bus, such as the peripheral component interconnect (PCI) bus or the VESA (Video Electronics Standards Association) VL bus. These standardized bus systems comprise usually a number of slots wherein each of the slots is capable of receiving an extension card. Each extension card can comprise a plurality or a single peripheral device, such as, a video card, serial and/or parallel interfaces, high speed communication interfaces, etc. To this end, each slot provides a plurality of connection pins. Communication between a bus system and other peripherals or the CPU is usually limited to the defined hardware and the respective protocols specified for the specific bus system.

During initialization of a information handling system, all devices are usually identified and integrated into the operating system. To this end, each devices might comprise a specific identification code stored in an internal register or dedicated internal non-volatile memory. This identification code can include a manufacturer or vendor identification code (ID) including the name of the vendor or manufacturer of the respective device. Modem operating systems collect all these information and use it to display the different devices and their vendor/manufacturer ID, for example, during a boot-up sequence, a diagnosis routine or when a configuration program is run. To this end, the information code is stored in the main controlling chips or chip sets. Thus, a extension card for a peripheral bus, such as a PCI-slot card will identify the chip manufacturer or chip vendor ID of a specific extension card instead of the manufacturer of the card. This can lead to confusion with the user of the system.

SUMMARY OF THE INVENTION

Therefore, a need for an improved slot based bus handling which overcomes the above mentioned problems exists.

A first method for retrieving information about a device within an information handling system comprising a central processing unit and a plurality of devices coupled with the central processing system through an internal bus and a slot based bus expansion system for adding a plurality of devices, comprises the steps of:

determining the location of a device within the system;
if the device is coupled through the internal bus, then requesting a primary identification information from the device;
otherwise requesting a secondary identification information from the device.

Another method according to the present invention for retrieving information about a device within an information handling system comprising a central processing unit and a plurality of devices coupled with the central processing system through an internal bus and a slot based bus expansion system for adding a plurality of devices during the initialization of the system, comprises the steps of:

performing at least all BIOS routines necessary for requesting device identification information;
determining the location of a device within the system;
if the device is coupled through the internal bus, then requesting a primary identification information from the device;
otherwise requesting a secondary identification information from the device.

Yet another method for retrieving information about a device within an information handling system comprising a central processing unit and a plurality of devices coupled with the central processing system through an internal bus and a slot based bus expansion system for adding a plurality of devices during the initialization of the system, comprises the steps of:

performing at least all BIOS routines necessary for requesting device identification information;
requesting and storing a primary identification information from all devices coupled internally; and
requesting and storing a secondary identification information from the device coupled through the slot based bus expansion system.

The bus system can be a PCI bus. The determination of the bus system can be performed by determining whether the device includes a PCI bus number. The retrieved primary or secondary information may be a coded or non-coded vendor or manufacturer name. The primary or secondary information can further be displayed during the execution of a setup program. The primary or secondary information can be stored within a memory location of the system comprising preference and configuration information about the devices coupled with the system. Alternatively, the primary or secondary information can be stored within a file of a mass storage unit comprising preference and configuration information about the devices coupled with the system.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
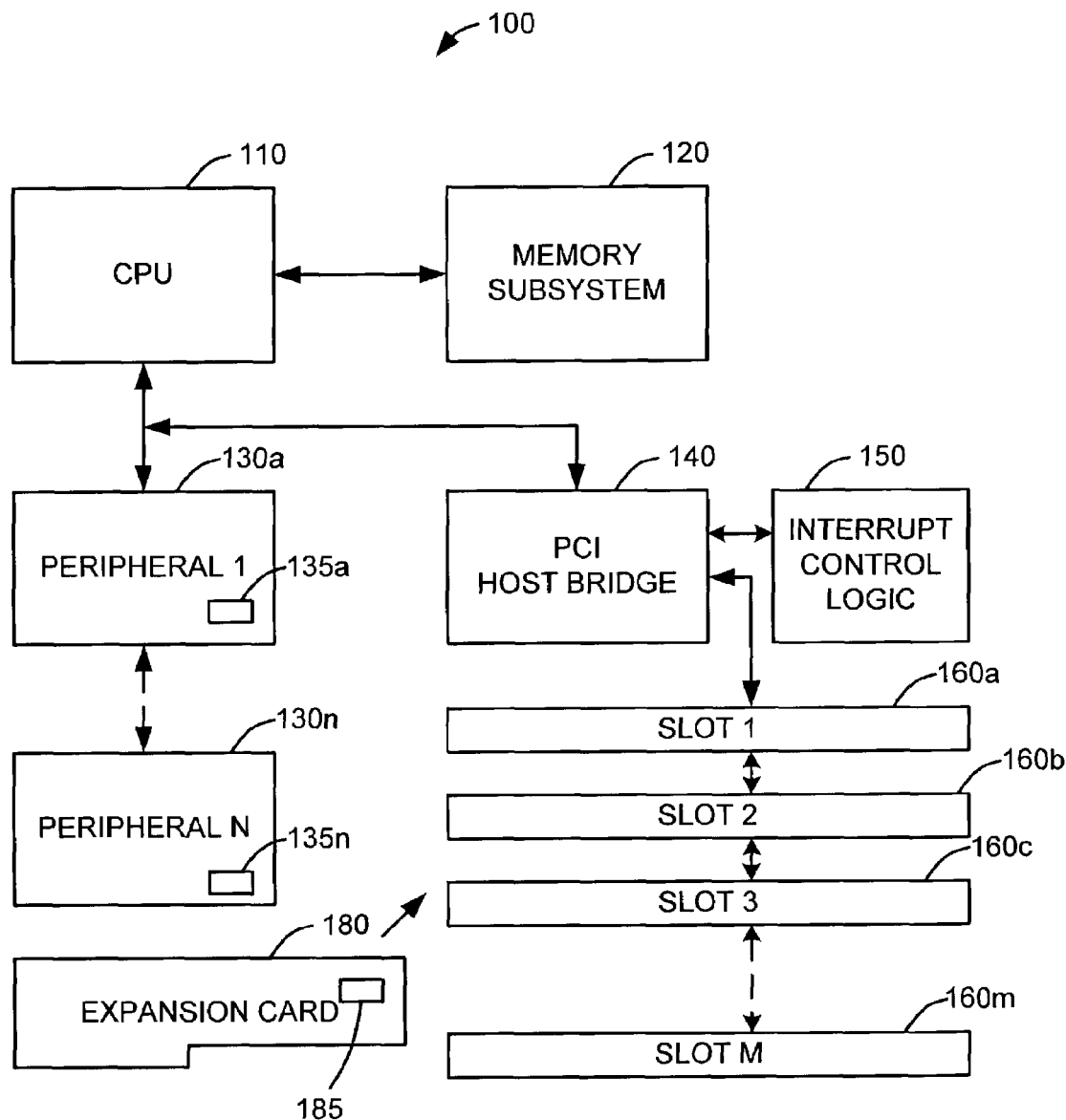
FIG. 1 is a block diagram of slot based computer system.

Turning to the drawings, exemplary embodiments of the present application will now be described. FIG. 1 is a block diagram of a computer system 100 showing only the parts relevant to the present invention. A central processing unit 110 (CPU) is coupled, for example, through a dedicated memory bus with a memory sub-system 120 comprising a memory controller unit and a plurality of memory banks. An internal bus structure 170 couples the CPU 100 with a plurality of peripheral devices 130a . . . 130n. Peripherals can include interrupt handling system, watchdog, a variety of I/O devices, mass storage control, etc. Each peripheral device can comprise a non-volatile register or memory section 135a . . . 135n which stores an individual identifier ID. In addition, each device can store other device related information in this memory. Furthermore, a slot based expansion system can be provided. To this end, FIG. 1 shows a PCI slot system as most common in today's information handling systems. A PCI host bridge 140 is coupled through bus 170 with CPU 110. The PCI host bridge 140 is furthermore, coupled with an interrupt control logic responsible for handling interrupts with respect to the PCI system. The PCI host bridge 140 is further coupled with a plurality of slots 160a . . . 160m. FIG. 1 also shows symbolic an expansion card 180 for reception in one of the slots 160a . . . 160m. Each expansion card 180 may also comprise a controlling chip or chip set having a non-volatile register or memory storing identification and configuration information. This non-volatile memory 185 may include a primary identifier for the respective chip manufacturer and additional sub identifier for storing information about the card manufacturer.

Figure 4:
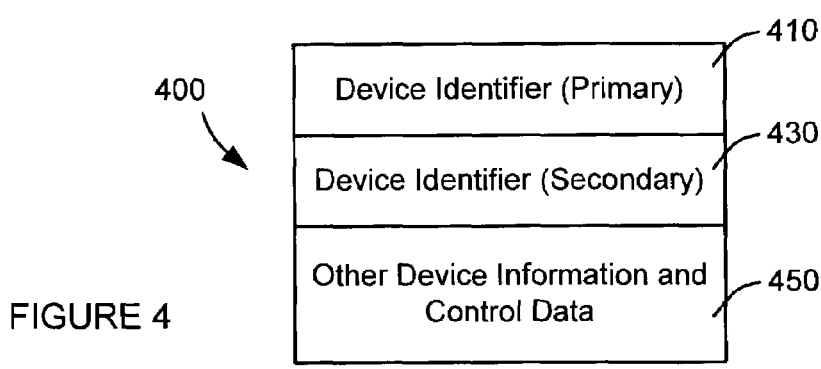
FIG. 4 is a diagram showing the structure of a non-volatile memory within a chip or chipset of a device.

FIG. 4 shows the organization of such a non-volatile memory 400 as used in chips or chip sets for expansion cards, such as used, for example, in a PCI slot system. A non-volatile memory 400 incorporated into a controller chip or chip set comprises a plurality of memory locations. A first location 410 may store a primary device identification information. Such an identification information can be uniquely assigned to a specific manufacturer. Thus, a manufacturer or vendor name is known by its unique identifier number. However, such a memory could also have multiple memory locations which can comprise the respective chip manufacturer name stored, for example in ASCII code or any other method for generating a vendor/manufacturer name can be used. The PCI standard uses a unique numeric ID which has to be petitioned with the Peripheral Component Interconnect Special Interest Group (PCISIG). Locations 430 allows storage of a secondary device identification information. In this location, a respective number uniquely identifying a card manufacturer in which the respective chip is incorporated can be stored. Again, multiple memory locations can be used to store a manufacturer or individual names. In addition, the non-volatile memory can include a section 450 for storing other device information and relevant control and/or configuration data. Each location 410, 430, or section 450 has an appropriate size to store enough data to allow proper identification of the vendors and/or manufacturers. For example, if unique identifier numbers are used to identify a vendor or manufacturer a 16 or 32 bit word can be used for memory locations 410 and 430. Section 450 might comprise a significant larger portion of the memory to store all relevant information necessary to operate an expansion card 180.

Figure 2:
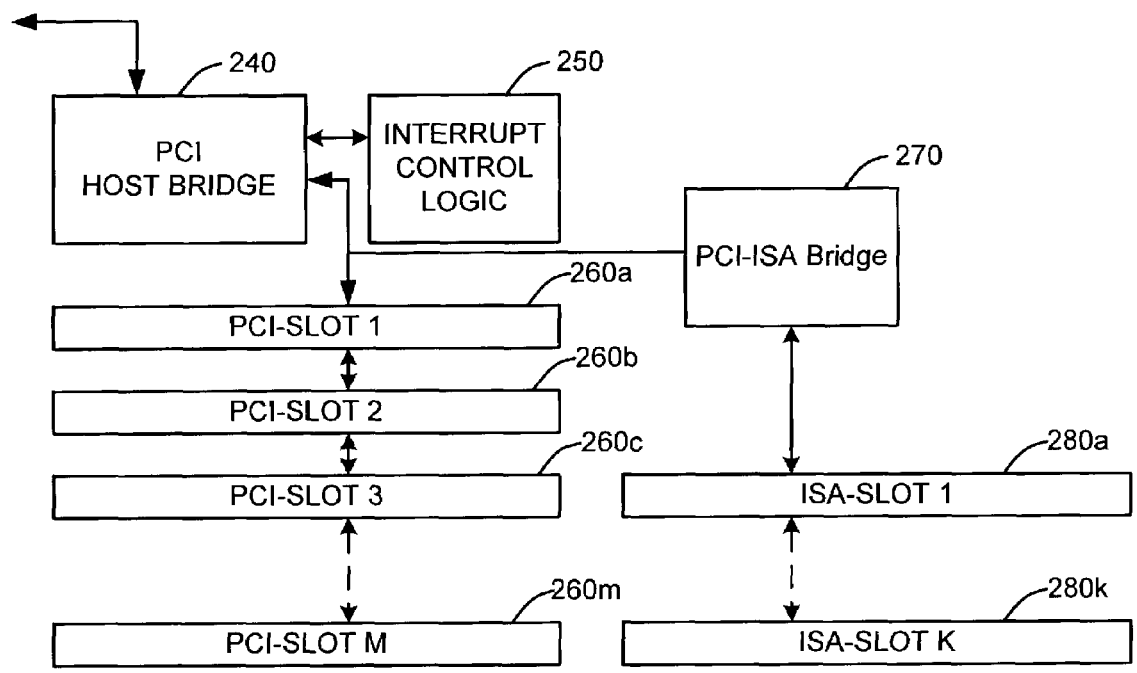
FIG. 2 is a partial block diagram of a second embodiment of a slot-based information handling system.

FIG. 2 shows an expanded slot based system including a PCI-bus system and an ISA bus system. Elements 240, 250, 260a . . . 260m correspond to elements 140, 150, 160a . . . 160m of FIG. 1, respectively. In addition a PCI-ISA bridge unit 270 is coupled to the PCI bus controlled by the PCI host bridge 240. This PCI-ISA bridge controls a second expansion bus comprising ISA slots 280a . . . 280k.

A user usually expands his system with an expansion card designed for a PCI or ISA slot as shown in FIGS. 1 and 2. In a setup menu, a user is allowed to adjust system interrupt resources and/or other configuration data for such an added card. The BIOS (basic input and output system) usually determines during a boot up phase the configuration of the respective information handling system including a determination which devices are coupled with the system. During this BIOS determination routine the device identifier for each device coupled with the system, whether directly coupled or through a slot based bus system, is retrieved and can be stored in a designated memory area of the system memory or in a file within the mass storage unit, such as a hard disk. If a user wants to adjust certain configurations for a specific device, the user usually initiates a setup or configuration program. These programs display all the devices which are setup for the system and allow to select all or several of the devices to be individually configured by the user. To this end, once a device is selected, all available information is retrieved directly from the respective device or from the previously written memory locations or from the file within the mass storage unit and will then be displayed. As explained above, this information can contain static information, such as the manufacturer or vendor name of the device, for example, a unique number identifying the vendor or manufacturer, and dynamic data which can be adjusted or altered.

As mentioned above, additional devices added through a slot based expansion bus usually transfer the identification information of their respective controller chips or chip sets back to the BIOS during initialization. Thus, the BIOS might refer to these devices with misleading information concerning the vendor or manufacturer of the respective adapter card that resources are being allocated for. The controller chips or chip sets may comprise non-volatile memory as shown in FIG. 4. However, usually the primary chip related identification information is returned to the BIOS during an initialization phase. As long as the chip manufacturer and the card manufacturer are the same entity there will be no misinformation. However, this will be not always the case as some chip manufacturers are not involved in expansion card manufacture. Once a user initiates a setup program he will thus be confronted with an unfamiliar name for an device added through the PCI bus of the user's computer system. This might lead to confusion of the user because he will not recognize the device by the displayed vendor name. As long as devices are an integral part of the motherboard of the respective system, the above mentioned facts will have little or no influence on a user. This is due to the fact, that the user usually does not know who manufactured the specific system integrated device. Also, very often the motherboard is manufactured by the chip manufacturer and, thus, no misleading information will be generated. However, when adding a PCI or other slot based expansion card, the user usually buys it from a specific vendor and the above mentioned misleading scenario might take place.

For example, a network adapter card or a small computer system interface (SCSI) card might be manufactured by the X-corporation whereas the chipset used on these cards might be manufactured by the Y-corporation. Even though, the non-volatile memory of the respective chip of the adapter card might contain information about both manufacturers, the BIOS will only receive the primary identifier which refers to the specific chip manufacturer.

Figure 3:
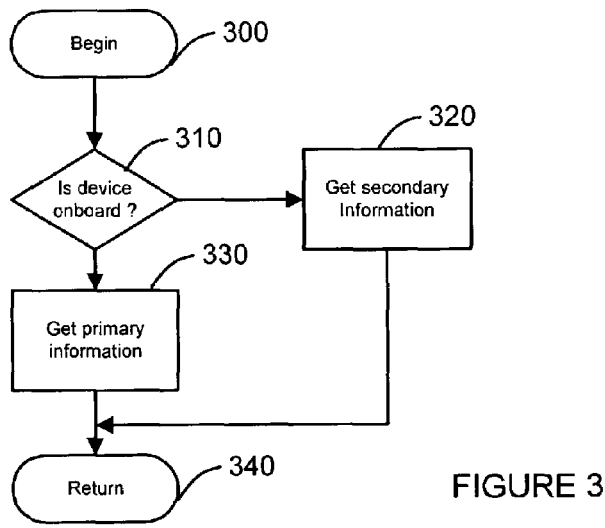
FIG. 3 is a flow chart diagram of a first method according to the present invention.

According to the present invention a different BIOS initialization routine and/or different setup programs can be used to overcome the above mentioned problems. A specific sub-routine for providing accurate manufacturer data will be established according to the present invention. FIG. 3 shows a flow chart for such a sub-routine. This routine first starts with step 300 and checks first in step 310 whether the requested device is located within the slot based expansion bus or the internal motherboard. If the device is located within the internal motherboard, then in step 320 the primary vendor ID will be used. Otherwise, the routine branches to step 330 in which the secondary identification information is requested from the respective device. The routine ends in step 340 where either of the two identification information is returned to the system. Thus, any program displaying the vendor/manufacturer information can properly identify the company the adapter was purchased from and not the underlying chipset manufacturer it contains.

The algorithm may contain a process to ask the system, through a system specific means, to detect if a particular PCI device is in an add-in slot or native to the motherboard. This routine would then use the PCI bus number and device number which can uniquely identify whether or not a device is a motherboard device. The Sub-system vendor ID or secondary ID would then be used for add-in cards, while the vendor ID will only be used if the device is onboard. In this manner, the actual manufacturer of the card will be identified rather than the vendor of a particular chipset on the card.

Figure 5:
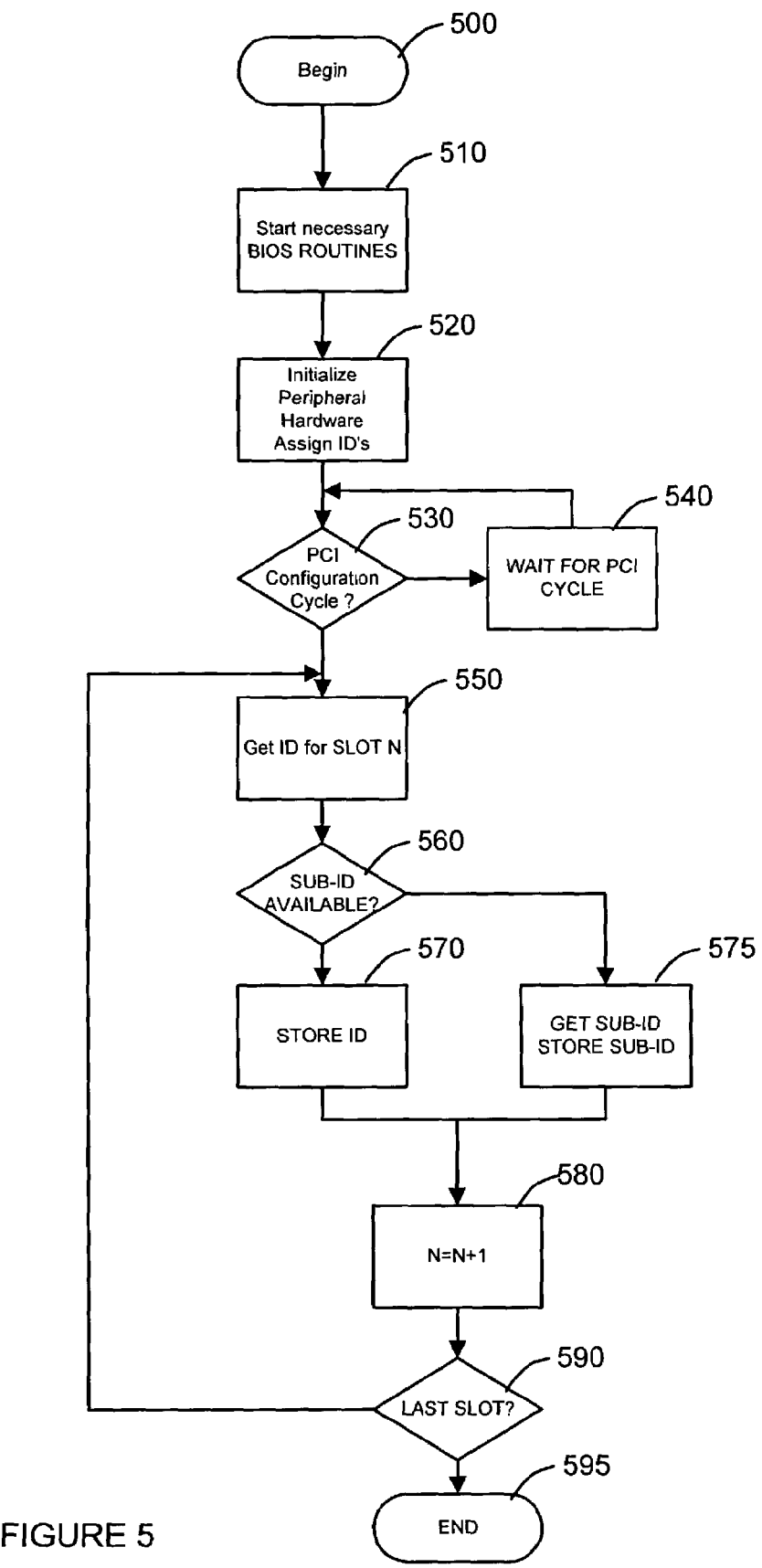
FIG. 5 is a flow chart diagram of a second method according to the present invention.

FIG. 5 shows another embodiment of the present invention implemented within a BIOS initialization routine. This method can be integrated into the BIOS, thus, ensuring that during initialization the proper information is collected and stored. The routine starts at step 500 and in step 510 all other BIOS routines which are necessary are started or have been started. In step 520 the onboard hardware, in other words devices that are an integral part of the motherboard, is initialized. In step 530 it will be determined whether a PCI configuration cycle is started. If not the system waits in step 540. In step 550, a primary ID for the first PCI slot is requested and in step 560 it is determined whether a secondary ID is available. If not, then the only available primary ID is stored in step 570. If yes, then in step 575 the respective secondary ID is retrieved and the routine continues with incrementing the index N for the slot number. In step 590 it is checked whether the last slot has been tested. If yes, the routine ends in step 595 and if not, then the routine continues repeating steps 550-590 until the last slot has been tested.

A respective pseudo code for the iterative part of checking PCI devices is shown below in Table 1:

TABLE 1

```
1-Loop on Bus # from 0 to 255
2-    Loop on Dev # from 0 to 31
3-        Loop on Fcn # from 0 to 7
4-            if a device is present at Bus:Dev:Fcn?
5-                if Fcn ==0
6-                    Multifunction = Device multi function
                        flag
7-                endif
8-                <Process device>
9-                if not Multifunction
10-                   break out of Fcn loop
11-               endif
12-           endif
13-       endloop
14-   endloop
15-endloop
```

In line 1, a main loop is started for requesting up to 256 different bus locations. In line 2, a second loop addresses up to 32 device per bus number. In line 3, another loop addresses up to 8 functions of each device. Line 5-7 determines whether the respective device is a multi-function device. In line 8, the respective primary and/or secondary retrieve function can be implemented amongst other initialization procedures. If the device is not a multi-function device, then line 9-12 terminates the inner loop.

The present invention is not limited to PCI bus systems but can be used for any type of bus system in which information about an inserted card can be transferred from the card to a controller unit. Other types of busses, such as an internal ISA or EISA bus an internal or external SCSI bus or any other suitable internal or external bus, or communication or control links can be used with the present invention. The present invention can be implemented into a BIOS for requesting the information and for storing the information permanently or for retrieving the information directly from the device upon request.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for retrieving information concerning the initialization of a device of an information handling system, the device including a chip, wherein the information handling system includes a motherboard and a plurality of slots coupled to the motherboard, comprising:
   determining where the device is coupled to the information handling system; and
   if it is determined that the device is coupled directly to the motherboard,
      retrieving from the device a set of primary information concerning the source of the chip of the device, and
      using the primary information in a BIOS-controlled routine for initializing the device; otherwise
   if it is determined that the device comprises an adapter card coupled to a slot of the plurality of slots coupled to the motherboard,
      retrieving from the device a set of secondary information concerning the source of the card of the device, and
      using the secondary information and not the primary information in a BIOS-controlled routine for initializing the device;
   wherein, if it is determined that the device is coupled directly to the motherboard, the secondary information is not used in the BIOS-controlled routine for initializing the device.

2. The method for initializing a device of claim 1 wherein the slot is coupled to a PCI bus of the information handling system.

3. The method for initializing a device of claim 1 wherein the slot is coupled to an ISA bus of the information handling system.

* * * * *